(12) United States Patent
Long et al.

(10) Patent No.: US 10,362,107 B2
(45) Date of Patent: Jul. 23, 2019

(54) SYNCHRONIZATION OF STORAGE TRANSACTIONS IN CLUSTERED STORAGE SYSTEMS

(71) Applicant: Liqid Inc., Lafayette, CO (US)

(72) Inventors: Christopher R. Long, Colorado Springs, CO (US); James Scott Cannata, Denver, CO (US); Phillip Clark, Boulder, CO (US)

(73) Assignee: Liqid Inc., Broomfield, CO (US)

( * ) Notice: Subject to any disclaimer, the term of this patent is extended or adjusted under 35 U.S.C. 154(b) by 489 days.

(21) Appl. No.: 14/846,445

(22) Filed: Sep. 4, 2015

(65) Prior Publication Data

US 2016/0072883 A1 Mar. 10, 2016

Related U.S. Application Data

(60) Provisional application No. 62/045,973, filed on Sep. 4, 2014.

(51) Int. Cl.
*H04L 29/08* (2006.01)
*G06F 11/00* (2006.01)
(Continued)

(52) U.S. Cl.
CPC ............ *H04L 67/1095* (2013.01); *G06F 1/10* (2013.01); *G06F 11/00* (2013.01); *G06F 11/16* (2013.01); *H04L 67/1097* (2013.01)

(58) Field of Classification Search
CPC ............ H04L 41/0266; H04L 41/0654; H04L 41/082; H04L 41/0853; H04L 41/0869; H04L 43/0811; H04L 67/1095; H04L 29/06027; H04L 29/0854; H04L 43/106; H04L 65/60; H04L 65/602; H04L 65/80;
(Continued)

(56) References Cited

U.S. PATENT DOCUMENTS 5,828,207 A 10/1998 Saadeh
6,061,750 A 5/2000 Beardsley et al.
(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.
(Continued)

*Primary Examiner* — Djenane M Bayard

(57) ABSTRACT

Systems, methods, apparatuses, and software for data storage systems are provided herein. In one example, a data storage system is provided that includes processing systems configured to receive storage operations for storage drives coupled over a communication fabric. The data storage system includes a control processor configured to establish a timer synchronization signal and distribute the timer synchronization signal to the processing systems. Each of the processing systems is configured to assign timestamps to received storage operations based on a timestamp counter synchronized among the processing systems using the timer synchronization signal. The processing systems are configured to order committing of the storage operations to the storage drives based at least on the timestamps associated with the storage operations.

20 Claims, 7 Drawing Sheets

(51) Int. Cl.
*G06F 11/16* (2006.01)
*G06F 1/10* (2006.01)

(58) Field of Classification Search
CPC ..... H04L 67/10; H04L 7/0008; H04L 7/0025; H04L 9/12; H04L 25/0398; H04L 27/2657; H04L 43/10; H04L 43/12; H04L 43/16; H04L 67/025; H04L 67/34; H04L 69/40; H04L 43/00; H04L 67/1097
See application file for complete search history.

(56) References Cited

U.S. PATENT DOCUMENTS

| | | | |
|---|---|---|---|
| 6,325,636 B1 | 12/2001 | Hipp et al. | |
| 7,243,145 B1 | 7/2007 | Portman | |
| 7,260,487 B2 | 8/2007 | Brey et al. | |
| 7,505,889 B2 | 3/2009 | Salmonsen et al. | |
| 7,606,960 B2 | 10/2009 | Munguia | |
| 7,725,757 B2 | 5/2010 | Padweka et al. | |
| 7,877,542 B2 | 1/2011 | Chow et al. | |
| 8,125,919 B1 | 2/2012 | Khanka et al. | |
| 8,150,800 B2* | 4/2012 | Webman | G06F 11/14 707/609 |
| 8,656,117 B1 | 2/2014 | Wong et al. | |
| 8,688,926 B2 | 4/2014 | Breakstone et al. | |
| 8,880,771 B2 | 11/2014 | Subramaniyan et al. | |
| 9,602,437 B1 | 3/2017 | Bernath | |
| 2002/0042844 A1* | 4/2002 | Chiazzese | G06F 1/14 709/248 |
| 2002/0059428 A1 | 5/2002 | Susai et al. | |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1* | 11/2008 | Rai | G06F 15/177 709/209 |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0276551 A1 | 11/2009 | Brown et al. | |
| 2010/0088467 A1 | 4/2010 | Lee et al. | |
| 2010/0103781 A1* | 4/2010 | Rai | G06F 1/12 368/55 |
| 2011/0289510 A1 | 11/2011 | Lin et al. | |
| 2011/0299317 A1 | 12/2011 | Shaeffer et al. | |
| 2011/0320861 A1 | 12/2011 | Bayer et al. | |
| 2012/0030544 A1 | 2/2012 | Fisher-Jeffes | |
| 2012/0089854 A1 | 4/2012 | Breakstone et al. | |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1* | 2/2014 | Hellwig | H04J 3/0697 370/503 |
| 2014/0059265 A1 | 2/2014 | Iyer et al. | |
| 2014/0075235 A1* | 3/2014 | Chandhoke | H04J 3/0667 713/401 |
| 2014/0103955 A1 | 4/2014 | Avritch et al. | |
| 2014/0108846 A1 | 4/2014 | Berke et al. | |
| 2014/0365714 A1 | 12/2014 | Sweere et al. | |
| 2015/0074322 A1 | 3/2015 | Galles | |
| 2015/0121115 A1* | 4/2015 | Chandra | H04J 3/0667 713/400 |
| 2015/0186437 A1* | 7/2015 | Molaro | G06F 17/30584 707/741 |
| 2015/0212755 A1 | 7/2015 | Asnaashari | |
| 2015/0304423 A1 | 10/2015 | Satoyama et al. | |
| 2015/0373115 A1 | 12/2015 | Breakstone et al. | |
| 2016/0197996 A1* | 7/2016 | Barton | H04L 67/1097 707/638 |
| 2016/0248631 A1 | 8/2016 | Duchesneau | |

OTHER PUBLICATIONS

International Application No. PCT/US2017/046602, International Search Report & Written Opinion, 8 pages, dated Oct. 19, 2017.

International Application No. PCT/US2017/046607, International Search Report & Written Opinion, 7 pages, dated Oct. 23, 2017.

Lu, Yingping et al., "Performance Study of iSCSI-Based Storage Subsystems," IEEE Communications Magazine, pp. 76-82, Aug. 2003.

* cited by examiner

SYNCHRONIZATION OF STORAGE TRANSACTIONS IN CLUSTERED STORAGE SYSTEMS

RELATED APPLICATIONS

This application hereby claims the benefit of and priority to U.S. Provisional Patent Application 62/045,973, titled "SYNCHRONIZATION OF STORAGE TRANSACTIONS IN CLUSTER," filed Sep. 4, 2014, which is hereby incorporated by reference in its entirety.

BACKGROUND

Computer systems typically include bulk storage systems, such as magnetic disk drives, optical storage devices, tape drives, or solid state storage drives, among other storage systems. As storage needs have increased in these computer systems, networked storage systems have been introduced which store large amounts of data in a storage environment physically separate from end user computer devices. These networked storage systems typically provide access to bulk data storage over one or more network interfaces to end users or other external systems. In addition to storage of data, remote computing systems include various processing systems that can provide remote computing resources to end users. These networked storage systems and remote computing systems can be included in high-density installations, such as rack-mounted environments.

However, as the densities of networked storage systems and remote computing systems increase, various physical limitations can be reached. These limitations include density limitations based on the underlying storage technology, such as in the example of large arrays of rotating magnetic media storage systems. These limitations can also include computing density limitations based on the various physical space requirements for network interconnect as well as the large space requirements for environmental climate control systems.

In addition to physical space limitations, these bulk storage systems have been traditionally limited in the number of devices that can be included per host, which can be problematic in storage environments where higher capacity, redundancy, and reliability is desired. These shortcomings can be especially pronounced with the increasing data storage and retrieval needs in networked, cloud, and enterprise environments. Moreover, when data storage drives are shared among many different processors or processing systems of data storage systems, data coherency and ordering can be troublesome, which can lead to data corruption and inadvertent overwriting of data.

Overview

Systems, methods, apparatuses, and software for data storage systems are provided herein. In one example, a data storage system is provided that includes a plurality of processing systems configured to receive storage operations for a plurality of storage drives coupled over a communication fabric, each of the plurality of storage drives configured to store data and retrieve the data stored on associated storage media responsive to the storage operations. The data storage system includes a control processor configured to establish a timer synchronization signal and distribute the timer synchronization signal to the plurality of processing systems. Each of the plurality of processing systems is configured to assign timestamps to received ones of the storage operations based on a timestamp counter synchronized among the plurality of processing systems using the timer synchronization signal. The plurality of processing systems are configured to order committing of the storage operations to the plurality of storage drives based at least on the timestamps associated with the storage operations.

In another example, a method of operating a data storage system is presented. The method includes, in a plurality of processing systems, receiving storage operations for a plurality of storage drives coupled over a communication fabric, with each of the plurality of storage drives configured to store data and retrieve the data stored on associated storage media responsive to the storage operations. The method includes, in a control processor, establishing a timer synchronization signal and distributing the timer synchronization signal to the plurality of processing systems. The method includes, in each of the plurality of processing systems, assigning timestamps to received ones of the storage operations based on a timestamp counter synchronized among the plurality of processing systems using the timer synchronization signal. The method includes, in the plurality of processing systems, ordering committing of the storage operations to the plurality of storage drives based at least on the timestamps associated with the storage operations.

In another example, a data storage system is presented. The data storage system includes a plurality storage drives configured to store data and retrieve the data stored on associated storage media responsive to data transactions. The data storage system includes one or more processing modules configured to each manage only an associated subset of the plurality of storage drives, each of the one or more processing modules coupled to an associated communication interface configured to receive storage transactions for any of the plurality of storage drives. The data storage system includes a management processor configured to establish a timer synchronization signal and distribute the timer synchronization signal to the one or more processing modules. The one or more processing modules are configured to receive the storage transactions, responsively associate the storage transactions with timestamps based at least on the timer synchronization signal distributed by the management processor, and selectively transfer ones of the storage transactions to at least another of the processing modules for handling of the ones of the storage transactions. Each of the one or more processing modules are configured to order a commit process for the storage transactions intended for the associated subset of the plurality of storage drives based at least on the timestamps of the storage transactions.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
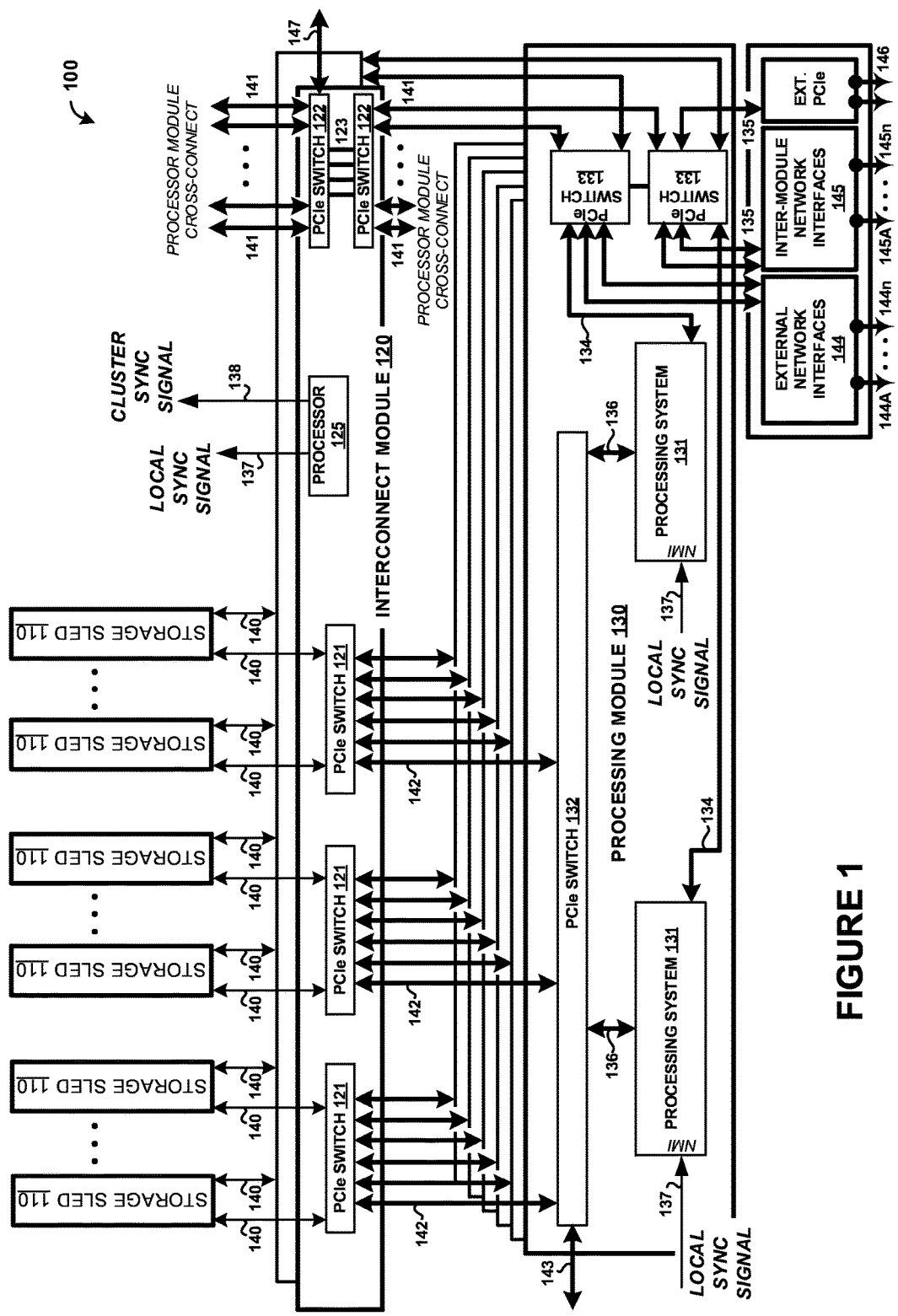
FIG. 1 is a system diagram illustrating a storage system.

FIG. 1 is a system diagram illustrating storage system 100. Storage system 100 includes three different module types in FIG. 1, namely storage sleds 110, interconnect modules 120, and processing modules 130. Although this example shows many storage sleds, 2 interconnect modules, and 6 processing modules. Any number of sleds or modules can be includes, such as 48 storage sleds or 64 storage sleds, along with a different number of interconnect or processing modules. Some examples can distribute functionality of each interconnect module 120 among two or more modules. Additionally, power supply modules and associated power and control distribution links can also be included, but are omitted in FIG. 1 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 1 are included in a "xU" (1U, 2U, 3U, etc. . . . ) modular chassis for mounting in a larger rackmount environment. It should be understood that the elements of FIG. 1 can be included in any physical mounting environment, and need not include any associated enclosures or rackmount elements.

Holdup circuitry can be included on each sled 110 to provide power to the associated sled when input power has been lost or removed for the sled. In some examples, the sled is removed from an associated mating connector and input power is lost due to the removal. In other examples, power is lost to system 100, such as during a facility power outage or when an associated power supply fails. Similar holdup circuitry can be included on the other various modules of system 100. Specifically, holdup circuitry can be included on interconnect modules 120 and processing modules 130.

A plurality of storage sleds 110 are included in system 100. Each storage sled 110 includes one or more storage drives, such as four. Each storage sled 110 also includes Peripheral Component Interconnect Express (PCIe) switches, processors, and control system elements. PCIe switches of each storage sled 110 communicate with one or more on-sled storage drives over associated PCIe links PCIe switches of each storage sled 110 also are communicatively coupled to an on-sled processor or control system for traffic statistics retrieval and status monitoring, among other operations. PCIe switches of each storage sled 110 communicate over one or more PCIe links 140 with an associated PCIe switch 121 of an interconnect module 120. The storage drives in each storage sleds 110 can each comprise a solid state drive (SSD), and each can communicate with a PCIe switch over an associated PCIe interface included in each storage drive, which are coupled through the PCIe switch to a switched PCIe fabric, such as the switched PCIe fabric formed by PCIe switches 121, among other elements.

The storage media of storage drives can comprise flash memory, static RAM, NAND flash memory, NOR flash memory, memristors, or other solid state storage media. Instead of or in addition to solid state storage media, each storage drive can comprise magnetic storage, such as hard disk drives, tape drives, magnetoresistive memory devices, and the like, or can comprise optical storage, such as phase change memory. Each storage drive can receive read transactions and write transactions issued by a host system, such as a processing system 131 of a processing module 130. Responsive to read transactions received over associated PCIe interfaces, the storage drives can retrieve data identified by the read transactions and transfer the data for delivery to the associated host. Responsive to write transactions received over associated PCIe interfaces, the storage drives can write data that accompanies the write transaction to storage media associated with storage drive.

Each PCIe switch 121 of interconnect modules 120 communicate over associated PCIe links 142 with associated PCIe switch 132 of one or more processing modules 130. PCIe switch 132 communicates with one or more associated processing systems 131 over PCIe links 136 as well as over one or more cross-connect PCIe links 143. Interconnect modules 120 also each include a plurality of PCIe switches 122 for interconnecting processor modules, such as processor modules 130. PCIe switches 122 are included for processor module cross-connect, and communicate with ones of PCIe switches 133 in associated processing modules 130 over processor module cross-connect links 141. PCIe switches 133 communicate with ones of processing systems 131 over PCIe links 134.

Each processing module 130 communicates over one or more PCIe links 135 through PCIe switches 133 with external expansion cards or external PCIe ports. In some examples, the external expansion cards include network interface cards for communicating over TCP/IP (Transmission Control Protocol (TCP)/Internet Protocol) networks or for carrying iSCSI (Internet Small Computer System Interface), Non-Volatile Memory Host Controller Interface Specification (NVMHCI) traffic, or NVMe (NVM Express) traffic among other network traffic types. These packet links are illustrated by packet network links 144, which include one or more links 144A-144n. External access to storage system 100 is provided over ones of packet network links 144, such as for end user access to data stored on storage sleds 110.

Each processing module 130 can also communicate with other processing modules, such as those in other storage assemblies or xU enclosures, over one or more inter-module packet network interfaces 145, which include one or more links 145A-145n. In some examples, inter-module packet network interfaces 145 include network interface cards for communicating over Ethernet or TCP/IP (Transmission Control Protocol (TCP)/Internet Protocol) networks for exchanging storage packets between processing modules. Further operation of inter-module storage packet exchange over Ethernet is discussed in the examples herein.

In some examples, external expansion cards comprising external PCIe connectors include one or more external PCIe interfaces for carrying NVMe traffic. These PCIe links are illustrated by links 146. External access to storage system 100 is provided over ones of PCIe links 146 and 147, such as for end user access to data stored on storage sleds 110. Storage system 100 is accessible by an external system, such as a server or computer system, over one or more PCIe interfaces. These PCIe interfaces are represented in FIG. 1 by PCIe link 146 and PCIe link 147. Further external PCIe links can be included, and two are shown in FIG. 1 for clarity. PCIe link 147 includes a PCIe link provided by PCIe switch 122 on I/O module 120. PCIe link 146 includes a PCIe link provided by an expansion card that interfaces with processing module 130 over PCIe switch 133. PCIe links 146 and 147 can include external PCIe connectors and cabling, such as employed in PCIe direct connect.

The PCIe switches discussed herein can comprise PCIe crosspoint switches, which logically interconnect various ones of the associated PCIe links based at least on the traffic carried by each PCIe link. In some examples, logical segregation of the PCIe fabric is achieved using non-transparent ports of the PCIe switches. Selected PCIe switch ports can be configured as non-transparent (NT) or transparent ports. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port.

In other examples, logical segregation of the PCIe fabric is achieved using domain-based routing of the PCIe switches. A domain-based PCIe signaling distribution can be included in the PCIe switches which allows segregation of PCIe ports of a PCIe switch according to user-defined groups. These logical segregation or groups can be used to form the front-end and back-end data planes discussed herein, or can be used for establishing routing and redundancy among the various PCIe switches, forming a mesh fabric of PCIe traffic in system 100.

In FIG. 1, PCIe switches 121 and 132 (and associated PCIe links) are included in a back end data plane of system 100, and used for carrying storage operations and storage data between storage sleds 110 and processing modules 130. PCIe switches 122 and 133 (and associated PCIe links) are included in a front end data plane of system 100, and used for carrying storage operations and storage data, as well as user control data and control signaling between processing modules. In some examples, one or more Ethernet interfaces and associated links comprise a control plane of system 100, such as over interfaces 145 as well as other Ethernet interfaces, such as shown for Ethernet links 447-448 of FIG. 4 below. The control plane can be used for control signaling between processing modules, management messaging, initialization messaging, statistical data monitoring and gathering from control processors, such as processor 450 of FIG. 4, among other control data and information.

In an alternative arrangement of system 100, which can be applied to the examples in further figures herein, a unified PCIe fabric is employed which does not physically distinguish among front-end data plane and back-end data planes. Instead, a common set of PCIe switches are employed which can route PCIe traffic among various destinations based on factors such as PCIe addressing, logic domains that are established, sideband PCIe messaging, or other techniques. In logical domain examples, a PCIe switch can be dynamically programmed by any processing system 131 or control processor. This programming can be done over a discrete control interface or link, or via specialized PCIe commands or sideband PCIe messaging, to segregate the PCIe links of the PCIe switch into various logical groups. However, in many of the examples herein, separate front end and back end data planes formed by separate PCIe fabrics are employed. It should be understood that either configuration is possible, such as unified data planes and unified PCIe fabrics, and the examples herein do not limit the configuration to one particular configuration of PCIe fabric.

PCIe can support multiple bus widths, such as ×1, ×4, ×8, ×16, and ×32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling Although PCIe is used in FIG. 1, it should be understood that different communication links or busses can instead be employed, such as Ethernet, Serial Attached SCSI (SAS), NVMe, FibreChannel, Thunderbolt, Serial Attached ATA Express (SATA Express), among other interconnect, network, and link interfaces. Any of the links in FIG. 1 can each use various communication media, such as air, space, metal, optical fiber, or some other signal propagation path, including combinations thereof. Any of the links in FIG. 1 can include any number of PCIe links or lane configurations. Any of the links in FIG. 1 can each be a direct link or might include various equipment, intermediate components, systems, and networks. Any of the links in FIG. 1 can each be a common link, shared link, aggregated link, or may be comprised of discrete, separate links.

In FIG. 1, any processing system 131 on any processing module 130 has logical visibility to all storage drives in all storage sleds 110. Any processing system 131 can transfer data for storage on any storage drive and retrieve data already stored on any storage drive. Thus, 'm' number of storage drives can be coupled with 'n' number of processors to allow for a large, scalable architecture with a high-level of redundancy and density.

To provide visibility of each processing system 131 to any storage sled 110, various techniques can be employed. In a first example, a particular processing system 131 manages (instantiates/binds) a subset number of the total quantity of storage sleds, such as 16 storage drives spanning 4 storage sleds, and handles transactions for that subset of storage drives, such as read and write transactions. Each processing system 131, however, has memory-mapped visibility to the storage drives managed by any other processing system 131. When a transaction is desired for a storage drive not managed by a particular processing system, the particular processing system uses the memory mapped access to all storage drives for that transaction. The transaction can be transferred and transitioned to the appropriate processing system that manages that storage drive associated with the data of the transaction. The front end data plane, namely PCIe switches 122 and 133 are used to transfer data between processing systems so that a particular processing system or processor can store the data in the storage sled or sleds that is managed by that particular processing system, even though the data might be received over a network interface associated with a different processing system.

In an example, the PCIe interfaces associated with each processing system 131 have 64-bit address spaces, which allows an addressable space of $2^{64}$ bytes, leading to at least 16 exbibytes of byte-addressable memory. The 64-bit PCIe address space can shared by all processing systems 131 for memory mapping to storage drives on storage sleds. Thus, while each particular processing system 131 actually manages a subset of the total storage drives on storage sleds, all processors 131 have visibility to, and can initiate read/write transactions to, any of storage drives on storage sleds. A managing processing system 131 that manages a particular storage drives on storage sleds receives write/read transactions and any associated data from an initiating processing system 131 by at least using the memory mapped PCIe address space.

In operation, such as a write operation, data can be received over any network interface 144 by any processing system 131 of any processing module 130. For example, the write operation can be a write operation received over network link 144 from an end user employing an iSCSI protocol or NVMe protocol. The processing system that receives the write operation determines if it physically manages the storage drive or drives associated with the write operation, and if it does, then the processing system transfers the data for storage on the associated storage drives over back end data plane PCIe links 136. If the processing system determines that it does not physically manage the storage drive or drives associated with the write operation, then the processing system transfers the write operation to another processing sled that includes the processing system that does manages the storage drive or drives over cross connect links 134. Data striping can be employed by any processing system to stripe data for a particular write transaction over any number of storage drives, such as over all of the storage sleds that include storage drives managed by the particular processing system.

NVMe (NVM Express) is an interface standard for mass storage devices, such as hard disk drives and solid state memory devices. NVMe can supplant serial ATA (SATA) interfaces for interfacing with mass storage devices in personal computers and server environments. However, these NVMe interfaces are limited to one-to-one host-drive relationship, similar to SATA devices. In the examples discussed herein, a PCIe interface can employed to transport NVMe traffic and present a multi-processor, multi-drive system as one or more NVMe virtual logical unit numbers (VLUNs) over a PCIe interface.

In NVMe operations, such as an NVMe write operation, data can be received over any of PCIe links 141-143 and 146-147 by any processing system 131 of any processing module 130. For example, the write operation can be an NVMe write operation received over PCIe link 143 from a device employing an NVMe protocol transported over a PCIe interface. In another example, the write operation can be an NVMe write operation received over PCIe link 146 or 147 from an external device employing an NVMe protocol transported over a PCIe interface. The processing system that receives the write operation determines if it manages the storage drive or drives associated with the write operation, and if it does, then the processing system transfers the data for storage on the associated storage drives over PCIe links 142. If the processing system determines that it does not physically manage the storage drive or drives associated with the write operation, then the processing system transfers the write operation to another processing sled that includes the processing system that does manages the storage drive or drives over cross connect links 134. Data striping can be employed by any processing system to stripe data for a particular write transaction over any number of storage drives, such as over all of the storage sleds that include storage drives managed by the particular processing system.

Any of processing systems 131 can present the storage resources of storage system 100 as a VLUN, such as NVMe VLUNs. Although these VLUNs can be associated with different processing systems on a single processing module 130, in other examples a VLUN is presented by any processing system on any processing module and can storage traffic for the VLUN can be handled by any processing system on any processing module. The processing modules of system 100 can present any number of VLUNs to an external system over a PCIe interface, such as any of PCIe links 146-147. These VLUNs can be presented as an NVMe target. An NVMe target can present the storage resources of storage system 100 as a single storage target, such as emulating a single storage drive, over a PCIe interface. In this manner, a plurality of storage drives that comprise any number of storage sleds 110 can be presented as a single NVMe target to an external system over a PCIe interface.

Any of the processing systems of system 100 can receive NVMe storage traffic, such as NVMe frames, and distribute these storage transactions for handling by an assigned processing system within system 100.

Some network storage protocols, such as iSCSI, allow for grouping of destination addresses into a logical unit. For example, iSCSI allows for portal groups which can associate more than one IP address with a single target. The target is a particular processor or particular network interface, even if that interface or processor has more than one network address associated therewith. A logical grouping of destination addresses can be formed for a network storage protocol using a plurality of processors or processing nodes that share a common storage space spread over a plurality of storage devices. Many processors can be included in a portal group, with each processor configured to receive network storage traffic for any of the other processors and route the traffic accordingly to the correct processor, even though a single iSCSI portal group is presented to an iSCSI initiator. In specific examples, a PCIe fabric is employed between many processors, network interfaces, and storage drives. These concepts can apply to network storage protocols other than iSCSI.

In FIG. 1, more than one network interface is employed. Specifically, network interfaces 144 or 145 can be coupled to the plurality of processing modules 130 shown in FIG. 1. Each network interface can have one or more IP addresses associated therewith, and can be reachable over a packet network using the associated IP addresses. The various network interfaces of system 100 can be formed into an iSCSI portal group, which allows an iSCSI initiator to transfer network storage transactions, such as iSCSI transactions, over a packet network to any of network interfaces 144 or 145. As a specific example, an iSCSI portal group can be formed from external network links 144A-144n. This portal group can be presented to network devices over network links 144A-144n, and the portal group can span the resources of system 100, such as one or more processing systems 131, one or more processing module 130, and one or more of storage sleds 110, among other elements.

I/O modules 120 also each include management processor 125. Management processor 125 includes one or more microprocessors or microcontrollers along with any associated storage memory. Management processor 125 communicates with storage sleds over sideband links which can comprise USB links or I2C links, among others. Management processor 125 accumulates statistical data and usage information for each storage sled in a storage system, such as that shown in FIG. 1. Processing modules can retrieve this statistical data or usage information over Ethernet links.

Additionally, management processor 125 manages and coordinates time synchronization across various processing modules of system 100 as well as with other systems when in a clustered environment. Management processor 125 maintains a counter as a synchronization signal and periodically resets the counter during a counter synchronization event. Management processor 125 distributes a synchronization signal to other processors included in other I/O modules, which can include I/O modules in system 100 as well as other I/O modules of a cluster. Discrete signal pathways can be employed to distribute the synchronization signal, such as general purpose I/O (GPIO) links. In FIG. 1, management processor 125 distributes local synchronization signal 137 for processing systems 131 in system 100 and cluster synchronization signal 138 for distribution to further storage systems or processing modules. In some examples, unused pins or spare pins or links in another communication link can be used as the synchronization signal, such as unused signal pins/links in a PCIe interface or SAS connector/cable used to connect enclosures in a clustered environment. For example, cluster synchronization signal 138 might be carried over spare connections in cabling used for PCIe links 147 or 143.

In a clustered environment, system 100 can be included in an enclosure, such as a 3U rackmount enclosure, among others. Similar systems to system 100 can also be included in further 3U enclosures, and various cabling can be employed to interconnect each enclosure. This cabling can include mini-SAS or mini-SAS HD cabling that is used to carry PCIe signaling. Extra or unused pins/wires in this interconnect can be employed to carry the synchronization signal to other I/O modules in other enclosures. Associated management processors on the other I/O modules can receive the synchronization signal from the originating processor/enclosure and distribute to elements within the associated enclosure.

In a first example, the counter is a free-running counter which is reset periodically responsive to the synchronization signal. This counter can count for a predetermined number of processing cycles or timer cycles until being reset by a predetermined or on-the-fly negotiated "master" management processor. Various delays in the transfer and acknowledgement of the synchronization signal can be used to fine tune the reset and count of the various counters maintained in each management processor and processing systems of processing modules.

Management processors of each enclosure/3U can distribute the synchronization signal to processing systems of the various processing modules of system 100. For example, management processor 125 can distribute the local synchronization signal to any of processing systems 131. Processing systems 131 can detect the local synchronization signal at a non-maskable interrupt (NMI) port or other pin and responsively reset internal counters responsive to the synchronization signal. Processing systems 131 use the internal counters to timestamp incoming storage transactions. Since all processing systems 131 have synchronized internal counters using the distributed synchronization signal, the timestamps used by each of processing systems 131 will be synchronized globally across all processing systems 131.

The synchronization signal can reset the various counters upon assertion or upon de-assertion. In "upon assertion" examples, the initial receipt of the synchronization signal resets the counter. In "upon release" examples, a release of the synchronization signal resets the counter, and the counter is held reset the entire time the synchronization signal is asserted. It should be understood than any polarity of the synchronization signal can be employed. Further examples of time stamping are discussed in FIGS. 2 and 3, and further examples of a synchronization signal are discussed in FIG. 3.

Figure 2:
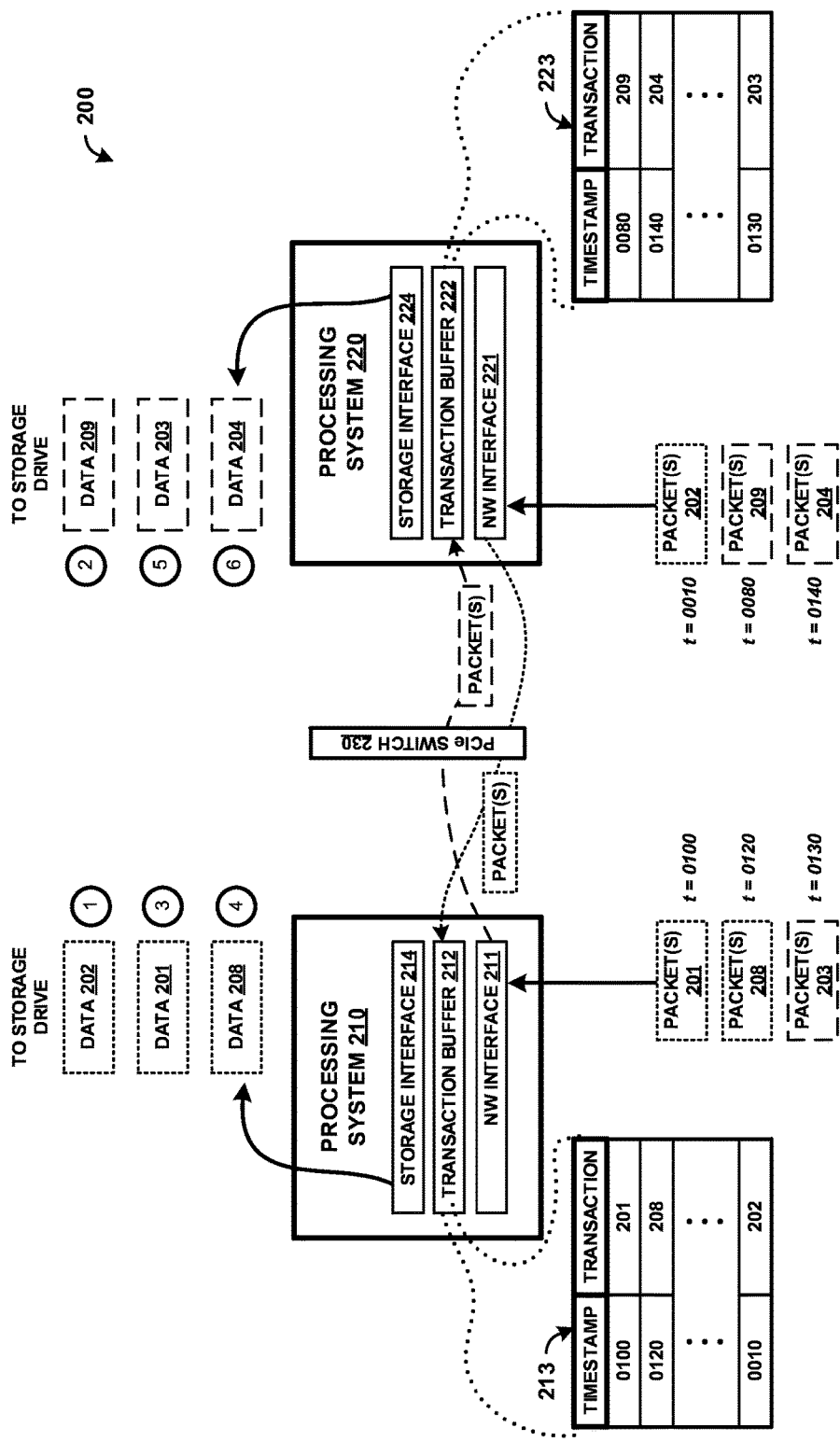
FIG. 2 is a system diagram illustrating a storage system.

FIG. 2 is a system diagram illustrating storage system 200. System 200 includes processing system 210, processing system 220, and PCIe switch 230. In FIG. 2, processing system 210 and processing system 220 are communicatively coupled by at least PCIe switch 230. Further redundant PCIe switches can be employed. PCIe switch 230 is included in a switched PCIe fabric of a storage system, and allows for transfer of storage transactions between processors.

In operation, packets are received by processing system 210 and processing system 220. These packets can be received by a network interface card associated with the processing systems, such as network interface 211 of processing system 210 or network interface 221 of processing system 220. The received packets are associated with storage transactions, such as a write transactions or read transactions, for data storage on an associated storage drive, such as a storage sled or SSD as discussed herein.

Each of processing systems 210 and 220 include associated network interfaces that can receive storage transactions for each other for redundancy, load balancing, failover protection, among other features. Additionally, as discussed above, each processing system manages or owns storage drives that are particular to each processing system. Specifically, processing system 210 will manage a first set of storage drives, while processing system 220 will manage a different second set of storage drives. However, if a storage operation for the second set of storage drives is received over a network interface associated with a processing system that manages the first set of storage drives, then the storage transaction can be transferred over a PCIe fabric comprising at least PCIe switch 230 for handling by another processing system.

In FIG. 2, packets 201, 202, and 208 are associated with storage transactions for storage drives managed by processing system 210 and packets 203, 204, and 209 are associated with storage transactions for storage drives managed by processing system 220. However, packets 203 are received by processing system 210 which manages a different set of storage drives not associated with packets 203. Likewise, packets 202 are received by processing system 220 which manages a different set of storage drives not associated with packets 202. These packets will be received into the various network stack layers of a network interface of the associated processing systems. If a particular storage transaction is received by a processing system that doesn't manage the storage drives identified by the storage transaction, the receiving processing system transfers the storage transaction to the managing processing system over at least PCIe switch 230. Once the storage transactions are received by the processing system that handles the storage drives identified by the storage transactions, then these storage transactions are stored in a transaction buffer. Specifically, packets 201, 208, and 202 are stored in transaction buffer 212 of processing system 210 even though packets 202 were received by processing system 220. Likewise, packets 209, 204, and 203 are stored in transaction buffer 222 of processing system 220, even though packets 203 were originally received by processing system 210.

However, due to delays in transferring the packets to the handling processing system, such as link delays, transport delays, interface delays, or processing delays, these packets might be stored in an incorrect order in a transaction buffer. The order is determined from when the packets are received in system 200. If the packets are for storage transactions to similar storage locations or address locations, then data ordering problems can arise.

A global timing and synchronization scheme is employed in system 200 to attach a timestamp to each incoming storage transaction indicated in the various received packets. If a storage transaction is received by any processing system then the storage transaction is marked with a timestamp that indicates when it was received by the processing system. Packets or frames associated with the storage transaction can carry the timestamp, such as in a header portion. If a storage transaction is then forwarded or transferred to another processing system for handling, then that handling processing system can ensure that a proper order for the storage transactions is enforced. Storage transactions in the associated transaction buffer can be handled out-of-order as stored in the buffer and instead are handled in temporal order according to the timestamp information for each storage transaction.

FIG. 2 shows an operation of one example timing sequence for the various packets, each with an associated time of receipt indicated in FIG. 2. Once the storage transaction has been stored in an associated transaction buffer, then the associated processing system can handle the storage transactions in a time-wise order instead of a first-in first-out (FIFO) order. Further details on the time synchronization are discussed in FIG. 3.

In FIG. 2, each processing system has a transaction buffer. Processing system 210 has transaction buffer 212, while processing system 220 has transaction buffer 222. The transaction buffer includes a data structure such as queue 213 for buffer 212 and queue 223 for buffer 222. The queue depth is selected to be deep enough to accommodate the time delay for a storage transaction received at another processing system to be transferred to the handling processing system. For example, queue 213 must include enough queue entries to accommodate a first storage transaction received at processing system 220 to be transferred to processing system 210 before a second storage transaction contemporaneous to the first storage transaction is committed to a storage drive by processing system 210.

As seen in FIG. 2, packets 203 are received at processing system 210 at t=0130 while packets 204 are received at processing system 220 at t=0140. Queue 223 of processing system 220 must be deep enough or have enough queue entries to ensure that the earlier-in-time storage transaction received by processing system 210 at t=0130 has enough time to be transferred by processing system 210 into transaction buffer 222 of processing system 220.

This delay to transfer a storage transaction between processing systems can include processing delays, communication delays, propagation delays, interface delays, link delays, among other delays. For example, first a storage transaction must be identified by a receiving processing system as handled by another processing system. Then the processing system transfers the storage transaction over a PCIe fabric comprising PCIe switch 230 for delivery to processing system 220. Processing system 220 then is notified of the pending storage transaction, such as by an interrupt or polling process, and identify that the storage transaction is to be handled by processing system 220. The storage transaction is placed into queue 223 of transaction buffer 222. The time taken from receipt and time stamping by the receiving processing system until the storage transaction is queued into the correct transaction buffer is considered in the queue depth. This depth can be calculated using probe transactions which can measure real-world delays, or can be estimated by calculating the various delays involved, including combinations thereof.

Before committing a storage transaction to a storage drive, each processing system checks each storage transaction in the queue entries of the associated transaction buffer and commits the storage transaction with the earliest timestamp. Other variations are possible.

Figure 3:
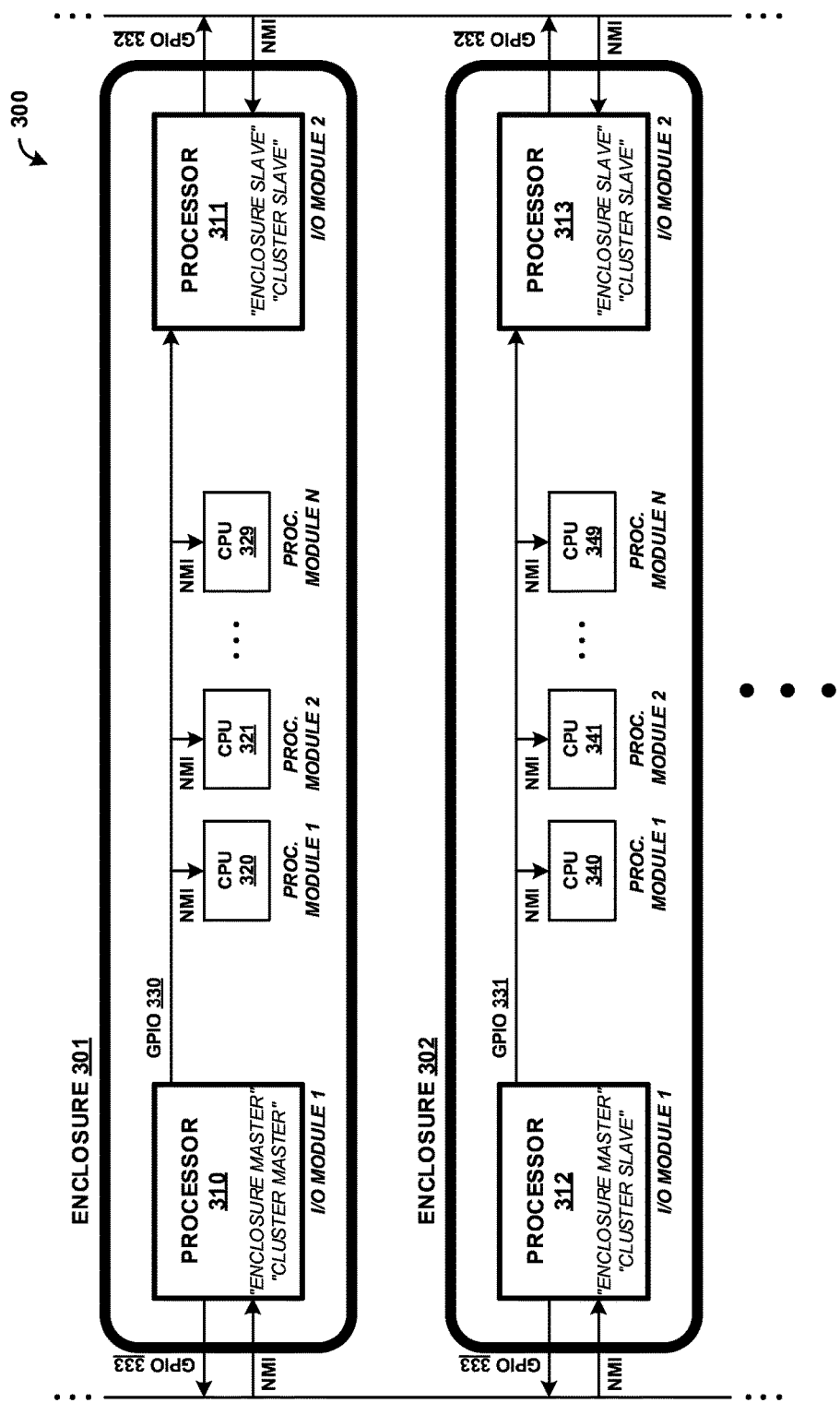
FIG. 3 is a system diagram illustrating a storage cluster.

To ensure timestamps are synchronized among the various processing modules of the storage system, such as among processing modules 130 of FIG. 1 and among other enclosures of a cluster, an enhanced time synchronization process is employed. As an example of the enhanced synchronized time for a storage cluster, FIG. 3 is presented. FIG. 3 is a system diagram illustrating storage cluster 300. Storage cluster 300 includes multiple storage systems, such as storage system 100 in FIG. 1 or storage system 200 in FIG. 200, although variations are possible. Each storage system is included in a separate enclosure which can comprise a rackmount enclosure that contains the associated storage system elements. A simplified storage architecture is shown in FIG. 3 to emphasize the time synchronization between processing elements. It should be understood that further elements can be included, such as those included in the Figures herein, such as storage drives, PCIe switches, power control elements, among other elements.

Enclosure 301 includes a first storage system that comprises management processors 310-311 and main processors (CPU) 320-329. Enclosure 302 includes a second storage system that comprises management processors 312-313 and main processors (CPU) 340-349. One or more of the CPUs are included on an associated processing module, such as found in FIG. 1. For example, an enclosure can include 1-N main processors (CPUs) included in 1-N processing modules. CPUs 320-329 can include processors that handle storage transactions, such as Intel, ARM, or AMD processors, among other processor types. Management processors 310-313 each include processors that handle management of elements of each storage system, such as statistical data collection and distribution, functionality monitoring, power control, as well as timing synchronization for ensuring storage transactions handled by CPUs 320-329 are committed in proper order. Management processors 310-313 can include Marvel XP or ARM processors, although variations are possible.

Enclosure 302 includes similar elements as enclosure 301, and in the discussion below, enclosure 301 will be considered. Enclosure 301 communicates over at least one discrete link that carries a synchronization signal. In FIG. 3, two discrete links are included, for redundancy and failover, namely GPIO 332 and 333. Other cluster interconnect can be included, such as PCIe interconnect carried over mini SAS HD cables. In some examples, the GPIO signals are carried over unused or extra pins/wires in a PCIe interconnect cable between enclosures, which can comprise mini SAS HD cables employed to carry PCIe signaling and traffic. A bus architecture can be employed, or a point-to-point architecture can be employed for the GPIO signals, including combinations and variations thereof.

Internal to each enclosure, another GPIO signal is employed to distribute a synchronization signal to the various CPUs as well as to a redundant "slave" management processor. Thus, for each cluster, one management processor can be configured to be a master for the enclosure that the management processor is located in and for the cluster itself. Different GPIO signals can be employed internally and as cluster signaling.

To synchronize a timing signal within an enclosure, the following procedure can be employed. First, a master management processor, such as processor 310, is determined. This can be determined upon power up of element of cluster 300, or can be negotiated or arbitrated between the various enclosures of cluster 300 upon power up or periodically. Failover protection can be enabled where a second management processor is configured to take over the master time synchronization if management processor 310 fails or becomes unresponsive.

The master management processor, namely management processor 310 in this example, maintains a counter that can be based on a clock signal or other cyclical signal. In some examples, the counter is a High Precision Event Timer (HPET) or High Resolution Timer (HRT) of processor 310. Initially, this counter is cleared and GPIO 330 is asserted which asserts the NMI port on each CPU 320-329. Responsive to the asserted NMI port, each CPU 320-329 executes software which clears a local counter, such as a HPET or HRT, within an interrupt service routine (ISR) and continues to reset the local counter until the ISR is exited. The ISR is exited on each CPU 320-329 when GPIO 330 is de-asserted or released. Upon exit from the ISR, CPU 320-329 now has a local counter synchronized to the counter maintained by processor 310 as well as to each other.

However, over time these counters can drift, due to slight differences in timing characteristics of each CPU, temperature, among other drift sources. Processor 310 re-synchronizes the CPU counters periodically, such as every billion counts or billion clock cycles which drive the counter of processor 310. The NMI/ISR routing would be repeated every time processor 310 asserts GPIO 330.

Drift for each CPU can be determined by comparing the current local count for each CPU against a target count, such as a billion cycles. If each CPU is instructed initially that the count will be reset using GPIO 330 after a predetermined number of cycles, then each CPU can subtract a local current count against the predetermined number of cycles to identify how many counts the CPU is offset by each reset period. This drift might be constant, such as due to the physical characteristics of the particular CPU. Once the drift is identified for a particular CPU, then that CPU can alter a local counter to take into account the drift each reset period. Drift can also be dynamic and vary from time to time, and the CPU can also determine this dynamic drift. Thus, a static drift and a dynamic drift can be determined and adjusted for by each CPU to maintain a synchronized counter across all CPUs in an enclosure. These counters are then employed in creating a timestamp for each incoming storage transaction, as discussed above.

Additionally, there can be propagation delays or transmission delays for the GPIO 330 signal within enclosure 301, such as due to signal trace length differences. These delays can be characterized by each CPU 320-329 and any counter maintained locally by a CPU can be offset by the particular delay associated with GPIO 330 signal delay for that CPU. Each CPU 320-329 can be configured to determine an offset for the GPIO 330 signal based at least on the associated ones of the propagation delays to synchronize the timestamp counters among CPU 320-329. Propagation delays can be ignored in some examples. However, in other examples, propagation delays can be characterized for each CPU and the counter reset enter/exit times can be altered to ensure that the counters maintained locally by each CPU are synchronized.

To synchronize the counters across more than one enclosure of cluster 300, such as among enclosures 301 and 302, the following process can be followed. A master enclosure is selected to be a master enclosure of the cluster. For example, enclosure 301 can be selected as a master. The master processor can be selected arbitrarily, such as a first processor which assumes a master role during power-on, or can be designated as a master by default, such as when all processors are pre-configured as slave processors and only a single processor will be initially designated as a master. Other methods to select the master processor can be employed, such as random selection processes, pre-programmed identities, having one of the CPUs indicate a master, or having a negotiation process occur between all of the control processors to identify the master, by having a master processor designated based on position within a rack enclosure, among other methods. Advantageously, any control processor can be selected as a master, in part because the global timestamping employed in the examples herein need not be tied to any external or "real" time, and instead can exist as relative to the cluster itself. The master management processor of that master enclosure, namely processor 310 in this example, is then the master management processor of the cluster for counter synchronization.

First, processor 310 alerts a slave processor in another enclosure, such as processor 312, that it is to be characterized. This alert can occur over signaling not shown in FIG. 3, such as sideband signaling, Ethernet signaling between each enclosure, or PCIe signaling between each enclosure. Once the slave management processor is alerted, GPIO 333 is asserted and detected at a NMI port of the slave processor. The slave management processor echoes the assertion of GPIO 333 back to processor 310. GPIO 333 can be used for this echo process, or another GPIO can be employed. Processor 310 can then calculate a turnaround time from assertion of GPIO 333 until the particular slave management processor echoes back an indication of the assertion. An external propagation delay can be identified from the turnaround time, such as by taking half of the turnaround time to be the propagation delay for that particular slave management processor. This characterization can be performed for each enclosure in the cluster with an associated slave management processor of the particular enclosure. This characterization process can also be performed upon power up or initialization of cluster 300, or can be re-performed periodically.

To allow propagation delay to be determined between the selected master processor and each slave processor individually, further operations can be employed. If a shared GPIO link is used between more than one slave processor, such as when GPIO 333 is employed as a 'bus' style of configuration, then addressing can be employed to individually identify and select a slave processor that reports or echoes assertion of the GPIO back to the master processor. For example, processor 310 can be designated as a master and processor 312 can be designated as a slave, but a plurality of other processors might share the same signaling link, such as GPIO 333. This addressing can occur over sideband signaling, such as serial interfaces, network interfaces, or other control interfaces shared between master and slave processors. The addressing can instead be issued serially over GPIO 333, such as by asserting a multi-bit address over GPIO 333 in a serial fashion to activate a response from only the particular slave processor whose address is indicated. An individually addressed slave processor can thus be instructed to respond to an assertion of GPIO 333 when the master processor desires to characterize delays for that slave processor. Likewise, other slave processors can be instructed ignore assertion of GPIO 333 when the individually addressed slave processor is being characterized. An individual slave processor under characterization can be placed into a characterization mode via a sideband interface, while other slave processors are not in the characterization mode, and thus only that one slave processor will respond to assertions of GPIO 333 with an echo signal. When the characterization mode is employed, then each slave processor can be placed individually into the characterization mode and instructed to exit the characterization mode once characterization for that slave processor is complete.

During normal operations, when synchronization is desired, processor 310 asserts GPIO 333 and each slave processor can responsively assert an internal GPIO, such as GPIO 331 for enclosure 302, for resetting counters of internal CPUs. Each enclosure in the cluster with thus have a counter synchronized for use in time-stamping incoming storage transactions.

To further refine the synchronization process, further delays can be accounted for across the various enclosures of cluster 300. For example, a delay between the assertion of the external GPIO by the master management processor and each slave management processor can be calculated. The master management processor can delay assertion of its internal GPIO for synchronizing CPUs internal to an associated enclosure. This delay can be based on a delay from when the master management processor asserts the external GPIO until each internal GPIO is asserted by each slave management processor of each enclosure. This delay can be characterized during an initialization process or periodically during operation and can be used to further synchronize assertion of each internal GPIO signal among the various enclosures of cluster 300. Thus, a global synchronization can occur for a counter that is used to timestamp incoming storage transactions across the entire cluster.

As with the internal counters, external drift can also be taken into account. A predetermined number of counts or cycles, such as a billion cycles, can be established before each reset of the counter by the master management processor. This predetermined number can be compared to a current local count for each slave management processor of each enclosure to determine how much the local count for each slave management processor of each enclosure has drifted each reset period. As discussed above, this drift amount can be corrected for in each management processor, which can include a static or dynamic drift amount.

Figure 4:
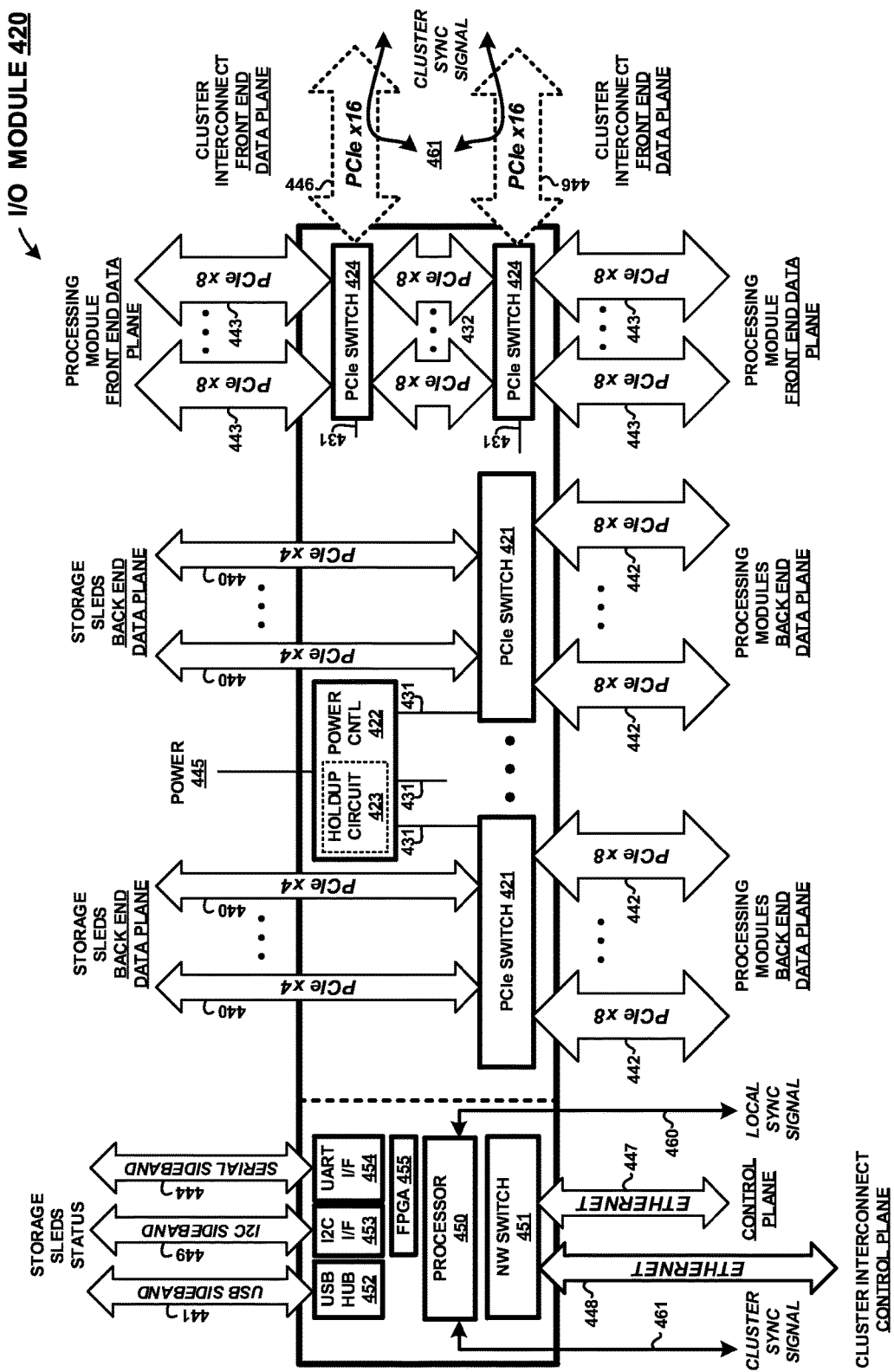
FIG. 4 is a block diagram illustrating control modules.

FIG. 4 is a block diagram illustrating input/output (I/O) module 420 as examples of interconnect module 120 of FIG. 1. It should be understood that the elements of module 420 can be combined onto a single module, such as shown in FIG. 1, or included in separate modules.

I/O module 420 includes at least two back end data plane PCIe switches 421, at least two front end data plane PCIe switches 424, power control module 422, and holdup circuit 423. Power control module 422 distributes power to each element of I/O module 420 over associated power links 431-433. Power control module 422 can selectively enable/disable power for each power link. Further communication links can be included for intra-sled communication between the various elements of I/O module 420.

PCIe switches 421, PCIe links 440, and PCIe links 442 are included in a back end data plane, or back end, of a storage system, such as that illustrated in FIG. 1. Each PCIe switch 421 communicates with two or more storage sleds (not pictured) over PCIe links 440, and with two or more processing modules (not pictured) over PCIe links 442. Each of links 440 comprises a PCIe link with four lanes, namely a "×4" PCIe link. Each of links 442 comprises a PCIe link with eight lanes, namely a "×8" PCIe link. In some examples, each PCIe switch 421 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 421 comprises a PCIe cross connect switch for establishing switched connections between any PCIe interfaces handled by each PCIe switch 421. In some examples, each PCIe switch 421 comprises a PLX Technology PEX8796 24-port, 96 lane PCIe switch chip.

PCIe switches 424 and PCIe links 443 are included in a front end data plane, or front end, of a storage system, such as that illustrated in FIG. 1. Each PCIe switch 424 communicates with many processing modules over PCIe links 443, and with each other over PCIe links 432. Each of links 443 and 432 comprises a PCIe link with eight lanes, namely a "×8" PCIe link. In some examples, each PCIe switch 424 communicates with six processing modules, such as shown in FIG. 1. Each PCIe link can also include sideband signaling, such as SMBus, JTAG, I2C, CAN, or any other communication interface, and in some examples is provided over separate links. Each PCIe switch 424 comprises a PCIe cross connect switch for establishing switched connections between any PCIe interfaces handled by each PCIe switch 424. In some examples, each PCIe switch 424 comprises a PLX Technology PEX8796 24-port, 96 lane PCIe switch chip.

Power control module 422 includes circuitry to selectively provide power to any of the elements of I/O module 420. Power control module 422 can receive control instructions from a processing module over any of PCIe links 442. In some examples, power control module 422 comprises processing elements discussed above for processor 320 of FIG. 3. Power control module 422 can receive power over power link 445 as a power source for the various elements of I/O module 420. Holdup circuit 423 includes energy storage devices for storing power received over power link 445 for use during power interruption events, such as loss of source power. Holdup circuit 423 can include capacitance storage devices, such as an array of capacitors. Further discussion of examples of power control circuitry is found below.

Power can be accepted by module 420 when input power is available, such as from a mating connector or midplane. Power can be redistributed to other modules by module 420 over link 445 when input power is not available, such as during power interruption events. When module 420 is removed from a mating connector, then power can be bled off into associated power sink circuitry. Although one power link 445 is shown, it should be understood that more than one link can be included, such as separate input and output links or separate links for different voltage levels. Also, although only module 420 shows power control circuitry and holdup circuitry in FIG. 4, similar circuitry and power links can be included in other control or interposer modules when module 420 is comprised of separate modules.

I/O module 420 includes processor 450, network switch 451, USB hub 452, I2C interface 453, and universal asynchronous receiver/transmitter (UART) interface 454. Network switch 451 can include one or more Ethernet switches, including transceivers, transformers, isolation circuitry, buffers, and the like. USB hub 452 includes USB hub circuitry for fanning out a single host USB connection to many device USB links, and can include transceivers, processors, transformers, isolation circuitry, buffers, and the like.

Processor 450 includes one or more microprocessors or microcontrollers along with any associated storage memory. Processor 450 communicates with processing modules over Ethernet control plane links 447 and 448. Processor 450 communicates with data storage sleds over sideband links 441, 444, and 449 which can comprise USB links, I2C links, or serial links, among others. An interworking or interposing module can facilitate communication by processor 450 over any of the sideband links, such as though FPGA 455. FPGA 455 provides protocol translation between an interface of processor 405, such as Serial Peripheral Interfaces (SPI), and the various serial sideband interfaces. For example, FPGA 455 can convert communications received over an SPI interface from processor 450 to communications of I2C interface 453 or communications of UART interface 454. Likewise, FPGA 455 can convert communications received over the sideband interfaces and transfer over an interface to processor 450. FPGA 455 can handle fan-out and replication of various interface for communications to interface with more than one storage sled over the associated sideband interfaces.

Processor 450 initializes data storage sleds, such as discussed above for sleds 110 of FIG. 1. Processor 450 accumulates statistical data and usage information for each storage sled in a storage system. Processing modules can retrieve this statistical data or usage information over Ethernet link 447 via network switch 451 from processing modules or over sideband links from data storage sleds. Ethernet link 447 comprises a control plane, which can be used for transferring control information and status information between processing modules. I/O module 420 also provides expansion of the control plane to other 3U enclosures for cluster control plane interconnect over Ethernet link 448. A further example of processor 450 can be seen in control processor 700 in FIG. 7.

Processor 450 manages and coordinates time synchronization across various processing modules of a storage system as well as with other systems when in a clustered environment. When in a "master" mode of operation, processor 450 maintains a counter as a synchronization signal and periodically resets the counter during a counter synchronization event. In "master" examples, processor 450 distributes a synchronization signal to other processors included in other I/O modules 420 as well as other I/O modules of a cluster. In other examples, processor 450 receives a synchronization signal from another processor. In FIG. 4, processor 450 can distributes local synchronization signal 460 for processing systems in the same system as I/O module 420, and cluster synchronization signal 461 for distribution to further storage systems or processing modules in the cluster. In some examples, unused pins or spare pins or links in another communication link can be used as the synchronization signal, such as unused signal pins/links in a PCIe interface or SAS connector/cable used to connect enclosures in a clustered environment. Specifically, PCIe links 446 might be carried over one or more cables to interconnect I/O modules of a cluster, and cluster sync signal 461 can be carried over wires or connection in those cables.

In a first example, the counter is a free-running counter which is reset periodically responsive to the synchronization signal. This counter can count for a predetermined number of processing cycles or timer cycles until being reset by a predetermined or on-the-fly negotiated "master" management processor. Various delays in the transfer and acknowledgement of the synchronization signal can be used to fine tune the reset and count of the various counters maintained in each management processor and processing systems of processing modules.

PCIe switches 424 each include cluster interconnect interfaces 446 which are employed to interconnect further I/O modules of other storage systems in further enclosures, such as in other 3U enclosures. Interfaces 446 comprise PCIe links with 16 lanes, namely "×16" PCIe links. Cluster interconnect provides PCIe interconnect between external systems, such as other storage systems, over associated external connectors and external cabling. These connections can be PCIe links provided by any of the include PCIe switches, among other PCIe switches not shown, for interconnecting other I/O modules of other storage systems via PCIe links. The PCIe links used for cluster interconnect can terminate at external connectors. These connections can instead be PCIe links provided by any of the included PCIe switches, among other PCIe switches not shown, for interconnecting other interconnect modules of other storage systems via PCIe links. The PCIe links used for cluster interconnect can terminate at external connectors, such as mini-Serial Attached SCSI (SAS) connectors which are employed to carry PCIe signaling over mini-SAS cabling.

The PCIe links used for cluster interconnect can terminate at external connectors, such as mini-Serial Attached SCSI (SAS) connectors which are employed to carry PCIe signaling over mini-SAS cabling. In further examples, Mini-SAS HD cables are employed that drive 12 Gb/s versus 6 Gb/s of standard SAS cables. 12 Gb/s can support PCIe Gen 3.

Figure 5:
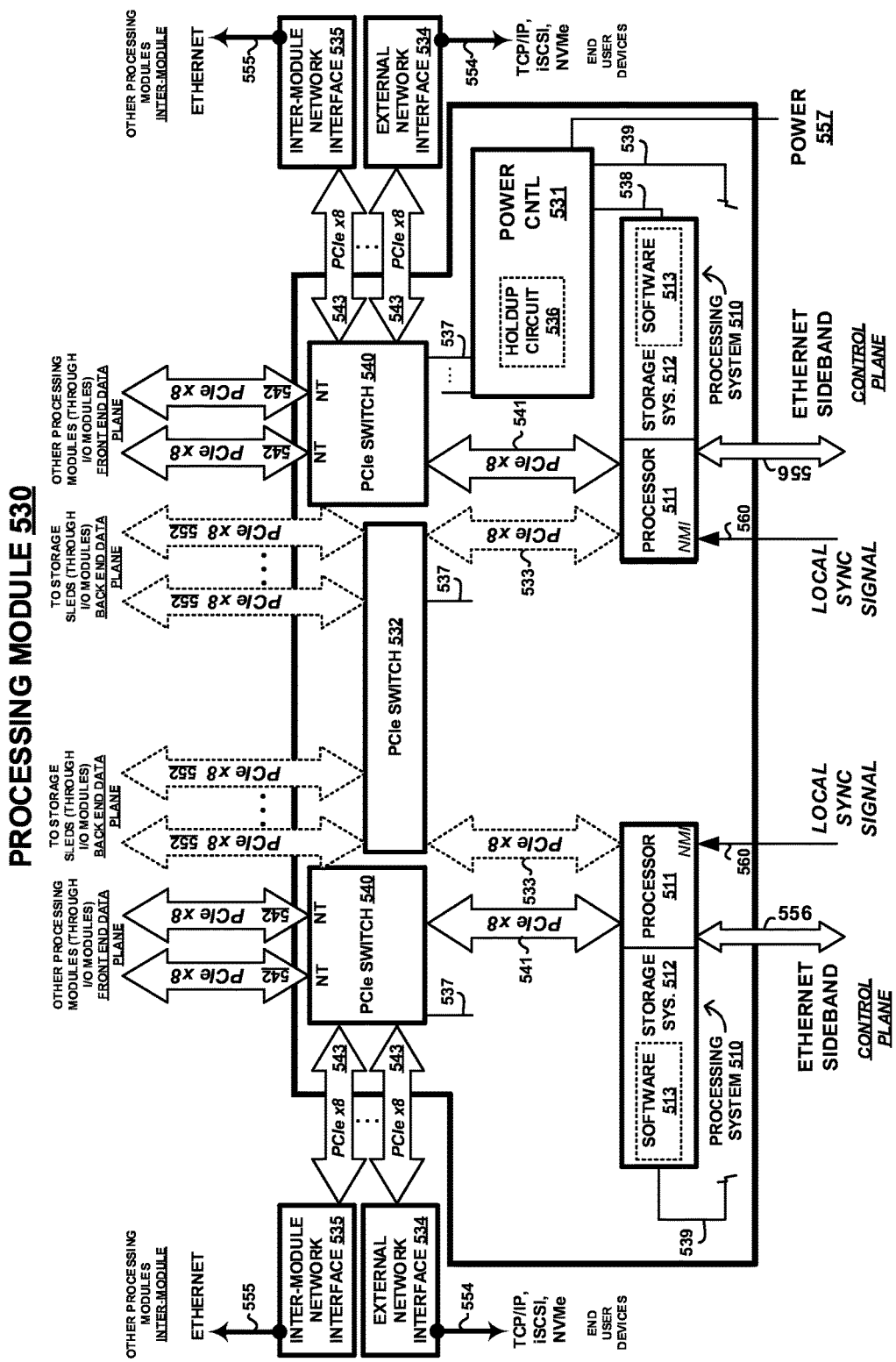
FIG. 5 is a block diagram illustrating a processing module.

FIG. 5 is a block diagram illustrating processing module 530, as an example of processing modules 130 of FIG. 1. Processing module 530 includes two or more processing systems 510, at least one PCIe switch 532, PCIe switches 540, network interfaces 534, power control module 535, and holdup circuit 536. Power control module 535 distributes power to each element of processing module 530 over associated power links 537-539. Power control module 535 can selectively enable/disable power for each power link. Further communication links can be included for intra-sled communication between the various elements of processing module 530.

Each processing system 510 further includes processor 511 and storage system 512. In some examples, network interfaces 534-535 are included in processing system 510, but network interfaces 534-535, or portions thereof, can be provided by separate circuitry and elements, such as separate PCIe expansion cards. Each processing system 510 can send and receive storage operations, such as storage packets over any of network interfaces 534-535, such as from external systems, end user devices, or from other processing systems of a cluster.

Each processor can communicate over an associated Ethernet sideband signaling link 556, such as with various microprocessors/controllers or power control nodes on other sleds or with interconnect, interposer, or control modules to retrieve statistical data or usage information. Links 556 can comprise Ethernet interfaces, or can comprise SMBus, JTAG, I2C, CAN, or any other communication interfaces, and in some examples is provided over separate links. Links 556 can be provided using external network interfaces, such as network interface cards or adapters communicatively coupled over ones of PCIe links 543. Each processor 511 also includes at least one PCIe interface, such as a PCIe transceiver and communication circuitry for communicating over associated PCIe links 533 and 541. The PCIe interface of each processor 511 can include a large number of PCIe lanes which are subdivided between narrower PCIe links, such as a ×16 interface that is subdivided among two ×8 links. In some examples, the PCIe interfaces are integrated into a single-chip die of processor 511. In other examples, the PCIe interface is provided over a separate microchip transceiver which can communicate with an associated processor 511 over another communication interface, such as a front-side bus of processor 511 or peripheral hub chip interface.

Timing sync signal 560 is coupled to a NMI port on each processor 511. Responsive to an asserted NMI port, each processor 511 can synchronize a timer maintained by the processor. For example, responsive to timing sync signal 560 asserted, each processor 511 can execute software which clears a local counter, such as a HPET or HRT, within an interrupt service routine (ISR) and continue to reset the local counter until the ISR is exited. The ISR is exited on each processor 511 when the NMI is de-asserted or released. Upon exit from the ISR, each processor 511 now has a local counter synchronized to the counter maintained by a control processor as well as to each other. Other methods to synchronize a timer based on an asserted or de-asserted signal input to each processor 511 can be performed.

Processor 511 can comprise one or more microprocessors and other processing circuitry that retrieves and executes software 513 from storage system 512. Processor 511 can be implemented within a single processing device but can also be distributed across multiple processing devices or sub-systems that cooperate in executing program instructions. Examples of processor 511 include general purpose central processing units, application specific processors, and logic devices, as well as any other type of processing device, combinations, or variations thereof. In some examples, processor 511 comprises an Intel or AMD microprocessor, ARM microprocessor, FPGA, ASIC, application specific processor, or other microprocessor or processing elements.

Storage system 512 can comprise any non-transitory computer readable storage media capable of storing software 513 that is executable by processor 511. Storage system 512 can include volatile and nonvolatile, removable and non-removable media implemented in any method or technology for storage of information, such as computer readable instructions, data structures, program modules, or other data. Storage system 512 can be implemented as a single storage device but can also be implemented across multiple storage devices or sub-systems co-located or distributed relative to each other. Storage system 512 can comprise additional elements, such as a controller, capable of communicating with processor 511. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 513 can be implemented in program instructions and among other functions can, when executed by processing system 510 in general or processor 511 in particular, direct processor 511 to operate as commanded by software 513. Software 513 can include processes, programs, or components, such as operating system software, database software, or application software. Software 513 can also comprise firmware or some other form of machine-readable processing instructions executable by elements of processing system 501, such as processor 511. Encoding software 513 on storage system 512 can transform the physical structure of storage system 512. The specific transformation of the physical structure can depend on various factors in different implementations of this description. Examples of such factors can include, but are not limited to the technology used to implement the storage media of storage system 512 and whether the computer-storage media are characterized as primary or secondary storage. For example, if the computer-storage media are implemented as semiconductor-based memory, software 513 can transform the physical state of the semiconductor memory when the program is encoded therein. For example, software 513 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Processing module 530 also interfaces with one or more network interfaces 534-535 to communicate over one or more associated network links 554-555. One or more network interfaces 534-535 are communicatively coupled to an associated processing system 510 or processor 511 via associated PCIe links 543 in FIG. 5. External access to processing module 530, and the storage sleds managed thereby, can be provided over ones of packet network links 554. Communication between processing modules or processors can be provided over ones of packet network links 555. In this example, packet network links 554-555 each comprises an Ethernet link for carrying various packet communications, such as Transmission Control Protocol/Internet Protocol (TCP/IP) communications, NVMe communications, or iSCSI communications, although other packet types can be employed. The network interfaces can comprise Ethernet interfaces, IP interfaces, T1 interfaces, or other local or wide area network communication interfaces which can communicate over a communication link. Examples of communication transceivers include network interface card equipment, receivers, transmitters, modems, and other communication circuitry. In some examples, network links 554 comprise a different bandwidth or transfer speed than network links 555.

PCIe switch 532 handles back end data plane or "back side" traffic for processing module 530 for storage and retrieval of data. PCIe switch 532 communicates with storage sleds through one or more interconnect modules (not pictured) over PCIe links 552, and with ones of processors 531 over PCIe links 533. Each of links 552 and 533 comprises a PCIe link with eight lanes, namely a "×8" PCIe link. PCIe switch 532 also includes processing module cross connect links 533, which in this example are four ×8 PCIe links. This processing module cross connect 533 allows a PCIe 532 switch on another processing module to handle back end data plane traffic for any processing module for load balancing and bottleneck prevention. PCIe switch 532 also can include PCIe links 552 for further processing module cross connect. PCIe switch 532 comprises a PCIe cross connect switch for establishing switched connections between any PCIe interface handled by PCIe switch 532. In some examples, PCIe switch 532 comprises a PLX Technology PEX8796 24-port, 96 lane PCIe switch chip.

PCIe switches 540 handle front end data plane or "front side" traffic for processing module 530 for communications between processors of different processing modules. PCIe switches 540 communicate with other processing modules through one or more interconnect modules (not pictured) over PCIe links 542, and with ones of processors 531 over PCIe links 541. Each of links 542 and 541 comprises a PCIe link with eight lanes, namely a "×8" PCIe link. PCIe switches 540 also includes external module links 543, which in this example are four ×8 PCIe links PCIe switches 540 comprise a PCIe cross connect switch for establishing switched connections between any PCIe interface handled by PCIe switches 540. In some examples, PCIe switches 540 each comprise a PLX Technology PEX8796 24-port, 96 lane PCIe switch chip.

Power control module 535 includes circuitry to selectively provide power to any of the elements of processing module 530. Power control module 535 can receive control instructions from a processor 511 over associated links 537-539 or additional communication links. In some examples, power control module 535 comprises processing elements discussed above for processor 320 of FIG. 3. Power control module 535 can receive power over power link 557 as a power source for the various elements of processing module 530. Holdup circuit 536 includes energy storage devices for storing power received over power link 557 for use during power interruption events, such as loss of source power. Holdup circuit 536 can include capacitance storage devices, such as an array of capacitors.

Figure 6:
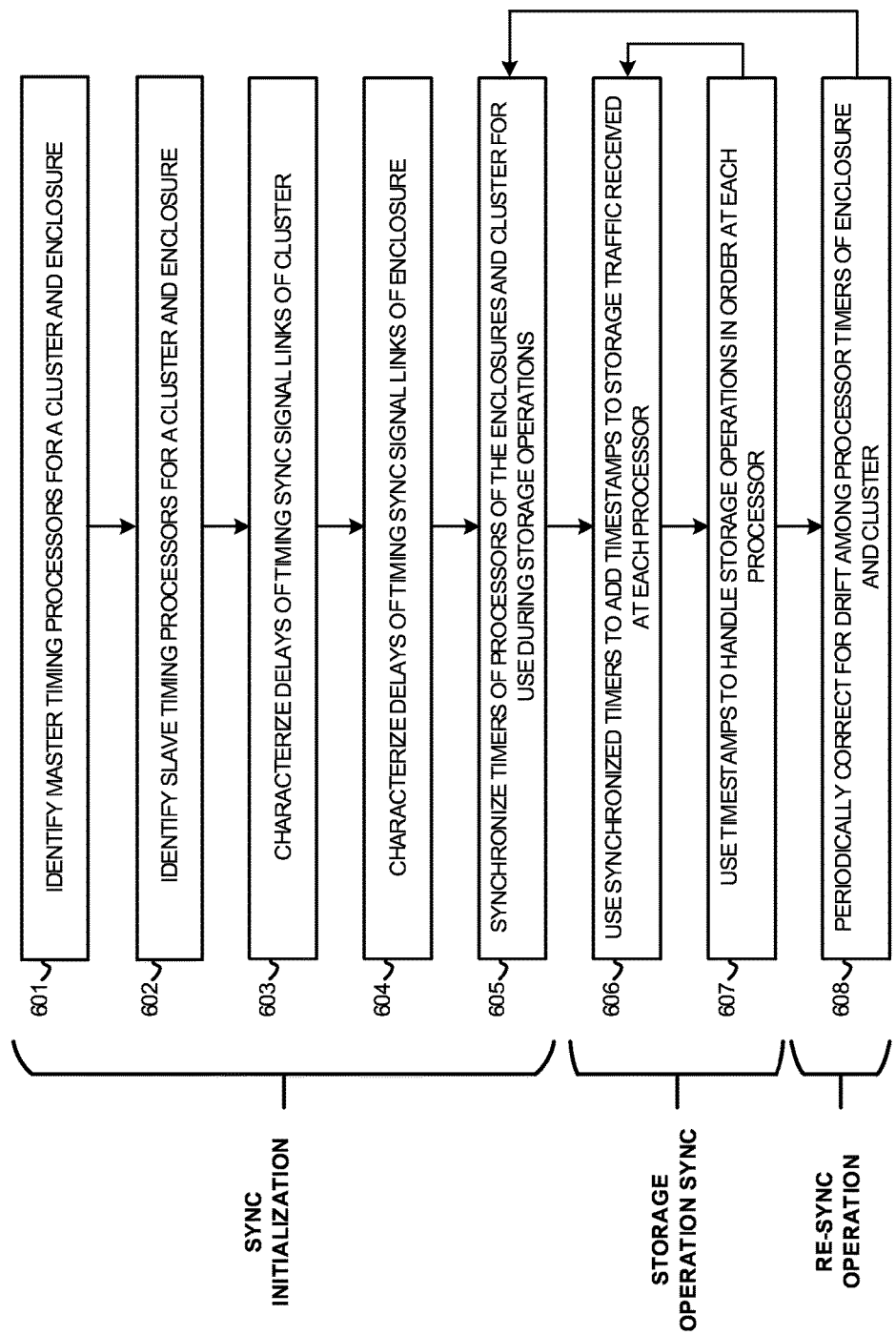
FIG. 6 is a flow diagram illustrating operation of a storage system.

FIG. 6 is a flow diagram illustrating operation of a data storage system. The operations of FIG. 6 are indicated below parenthetically. In FIG. 6, the operations are performed by associated ones of control processors or CPU/storage processors. For example, operations 601-605 can be performed by combinations of control processors, such as such as processor 125 in FIG. 1, processors 310-313 in FIG. 3, or processor 450 of FIG. 4. Operations 606-608 can be performed by combinations of storage processors, such as processors 131 in FIG. 1, processors 210/220 in FIG. 2, CPUs 320-329/340-349 in FIG. 3, or processor 511 of FIG. 5. It should be understood that combinations of the various processors or processing systems can be used to perform the operations of FIG. 6. Also, FIG. 7 includes control processor 700 which can perform the operations of FIG. 6.

For the purposes of discussion, the operations of FIG. 6 will be considered in the context of elements of FIG. 1. In FIG. 6, processor 125 identifies (601) master timing processors for a cluster and enclosure and (602) slave timing processors for a cluster and enclosure. The elements of system 100 can be included in a storage enclosure, such as a 3U enclosure. The cluster can comprise several enclosures, such as shown in FIG. 3, which can comprise an entire rack of enclosures, or more. Many control processors, such as two control processors per enclosure, can be included in a cluster, and among these a master control processor can be established for each enclosure and also established for the entire cluster. The master control processor can transmit a timer synchronization signal to slave control processors of the cluster (which can be master control processors of a particular enclosure). The master control processors of each enclosure transmits a timer synchronization signal to storage processors within the enclosure to indicate to the storage processors to synchronize counters used for timestamps.

To ensure better synchronization among both the enclosures of a cluster and of storage processors within an enclosure, the master control processor can follow a process to identify various delays in distributing the timer synchronization signals. The master control processor characterizes (603) delays of timer synchronization signal links of cluster by determining turn-around times for responses from slave control processors of the cluster. Each control processor of an enclosure can characterizes (604) delays of timer synchronization signal links for storage processors of the enclosure by determining response times for the storage processors. Timing offsets can be established for the storage processors of an enclosure and for the slave control processors of a cluster. These timing offsets can ensure that when a master control processor of a cluster asserts a timer synchronization signal for the cluster, that both the slave control processors of the cluster and individual storage processors of each enclosure can be properly synchronized by considering the distribution delays and compensating using timing offsets.

During operation, the master control processor periodically synchronizes (605) timers of processors of the enclosures and cluster for use during storage operations. The timer synchronization signal can be asserted (or de-asserted) periodically as discussed herein to cause the various storage processors to reset or sync counters maintained by each of the storage processors. The storage processors each use (606) their respective synchronized timers to add timestamps to storage traffic received at each storage processor, such as over ones of network interfaces 144-146 or PCIe interfaces 134/136. Each storage processor then uses (607) the timestamps to handle storage operations in order at each processor, such as for performing read or write operations with storage drives on ones of storage sleds 110.

Each storage processor can also periodically corrects (608) for drift. This drift can occur due to differences in clock rates of each processor due to inaccuracies in clock generation circuits, temperature variations, passive circuit tolerances, among other circuit variations. When the timer synchronization signal is periodically asserted, the processors can also take a snapshot of the current timestamp or associated counter value to compare to other storage processors. Each processor can then determine how much drift has occurred compared to the other storage processors and compensate for the drift with additional offsets, leading to even more accurate and synchronized timestamps among the various storage processors of the cluster and enclosures.

Figure 7:
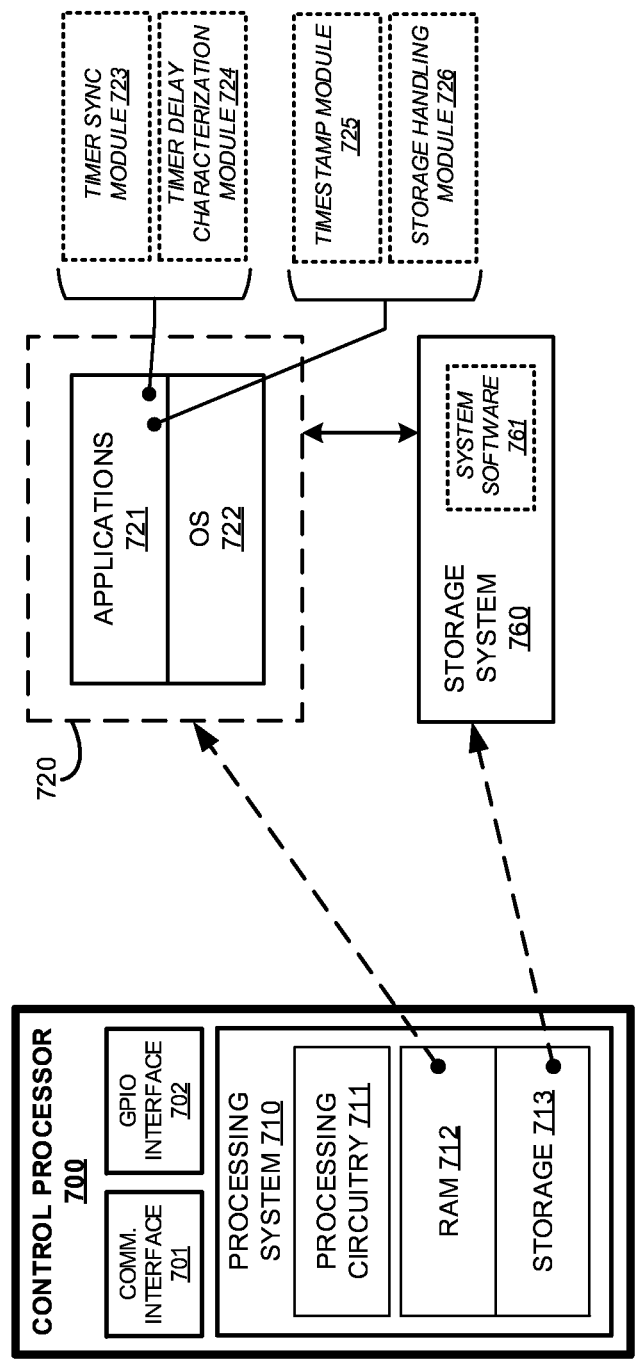
FIG. 7 is a block diagram illustrating a control processor.

FIG. 7 is s block diagram illustrating processing system 700. Processing system 700 illustrates an example of any of the control processors, power control elements, or sled processors discussed herein, such as processor 125 of FIG. 1, processor 450 and power controller 422 of FIG. 4, or power controller 531 of FIG. 5. In addition, processing system 700 can be illustrative of any processing system, processor, or CPU on a processing module, such as processing system 131 of FIG. 1, processing systems 210 or 220 in FIG. 2, or processor 511 of FIG. 5, among others.

Control processor 700 includes communication interface 701 and processing system 710. Processing system 710 includes processing circuitry 711, random access memory (RAM) 712, and storage 713, although further elements can be included. Example contents of RAM 712 are further detailed in RAM space 720, and example contents of storage 713 are further detailed in storage system 760.

Processing circuitry 711 can be implemented within a single processing device but can also be distributed across multiple processing devices or sub-systems that cooperate in executing program instructions. Examples of processing circuitry 711 include general purpose central processing units, microprocessors, application specific processors, and logic devices, as well as any other type of processing device. In some examples, processing circuitry 711 includes physically distributed processing devices, such as cloud computing systems.

Communication interface 701 includes one or more communication and network interfaces for communicating over communication links, networks, such as packet networks, the Internet, and the like. The communication interfaces can include serial links, such as SPI links, I2C links, USB links, UART links, or one or more local or wide area network communication interfaces which can communicate over Ethernet or Internet protocol (IP) links Communication interface 701 can include network interfaces configured to communicate using one or more network addresses, which can be associated with different network links Examples of communication interface 701 include network interface card equipment, transceivers, modems, and other communication circuitry.

GPIO interface 702 includes one or more communication interfaces for communicating over communication links, such as discrete signaling lines, or differential signaling lines, the like. The communication interfaces can include general purpose input/output links, or can include serial links, such as SPI links, I2C links, UART links Examples of GPIO interface 702 circuitry comprise transmission gates, flow control circuitry, amplifiers, buffers, or other circuitry.

In some examples, GPIO interface 702 and communication interface 701 are included in similar circuit elements.

RAM 712 and storage 713 together can comprise a non-transitory data storage system, although variations are possible. RAM 712 and storage 713 can each comprise any storage media readable by processing circuitry 711 and capable of storing software. RAM 712 can include volatile and nonvolatile, removable and non-removable media implemented in any method or technology for storage of information, such as computer readable instructions, data structures, program modules, or other data. Storage 713 can include non-volatile storage media, such as solid state storage media, flash memory, phase change memory, or magnetic memory, including combinations thereof. RAM 712 and storage 713 can each be implemented as a single storage device but can also be implemented across multiple storage devices or sub-systems. RAM 712 and storage 713 can each comprise additional elements, such as controllers, capable of communicating with processing circuitry 711.

Software stored on or in RAM 712 or storage 713 can comprise computer program instructions, firmware, or some other form of machine-readable processing instructions having processes that when executed a processing system direct control processor 700 to operate as described herein. For example, software can drive processor 700 to establish timer synchronization signals, receive timer synchronization signals from other control processors and responsively generate further timer synchronization signals, and establish master-slave status among control processors, among other operations. The software can also include user software applications. The software can be implemented as a single application or as multiple applications. In general, the software can, when loaded into a processing system and executed, transform the processing system from a general-purpose device into a special-purpose device customized as described herein.

RAM space 720 illustrates a detailed view of an example configuration of RAM 712. It should be understood that different configurations are possible. RAM space 720 includes applications 721 and operating system (OS) 722. Software applications 721 each comprise executable instructions which can be executed by processor 700 for operating a processor, CPU, controller, or other circuitry according to the operations discussed herein.

When control processor 700 is operated as a timer control processor or management controller, such as processor 125 in FIG. 1, processors 310-313 in FIG. 3, or processor 450 of FIG. 4, application modules 723 and 724 can be employed. When control processor 700 is operated as a central or storage processor or processing system of a processing module, such as processors 131 in FIG. 1, processors 210/220 in FIG. 2, CPUs 320-329/340-349 in FIG. 3, or processor 511 of FIG. 5, application modules 725 and 726 can be employed.

Timer sync module 723 identifies master timing control processors for a cluster or storage enclosure, identifies slave timing control processors for a cluster or storage enclosure, transfers timer synchronization signals for delivery to one or more slave control processors or storage processors, and receives timer synchronization signal from a master control processor, among other operations. Timer delay characterization module 724 determines timing or signal delays among storage processors or among other control processors, such as in coordination with one or more slave control processors, and notifies storage processors of any timing delays for offsetting of timers/counters.

Timestamp module 725 establishes a timer or counter which is employed as a timestamp for incoming storage operations or storage transactions. Storage handling module 726 can receive the storage operations and timestamp module 725 can apply a timestamp to these storage operations. Timestamp module 725 uses an incoming timer synchronization signal along with any identified offset to reset a counter or synchronize a count value of a counter among various processing modules of an enclosure or cluster.

Applications 721 and OS 722 can reside in RAM space 720 during execution and operation of control processor 700, and can reside in storage system 760 during a powered-off state, among other locations and states. Applications 721 and OS 722 can be loaded into RAM space 720 during a startup or boot procedure as described for computer operating systems and applications.

Storage system 760 illustrates a detailed view of an example configuration of storage 713. Storage system 760 can comprise flash memory such as NAND flash or NOR flash memory, phase change memory, magnetic memory, among other solid state storage technologies. As shown in FIG. 7, storage system 760 includes system software 761. As described above, system software 761 can be in a non-volatile storage space for applications and OS during a powered-down state of control processor 700, among other operating software.

Control processor 700 is generally intended to represent a computing system with which at least software 761 and 721-722 are deployed and executed in order to render or otherwise implement the operations described herein. However, control processor 700 can also represent any computing system on which at least software 761 and 721-722 can be staged and from where software 761 and 721-722 can be distributed, transported, downloaded, or otherwise provided to yet another computing system for deployment and execution, or yet additional distribution.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:
1. A data storage system, comprising:
a plurality of processing systems configured to receive storage operations for a plurality of storage drives coupled over a communication fabric, each of the plurality of storage drives configured to store data and retrieve the data stored on associated storage media responsive to the storage operations;
a control processor configured to establish a timer synchronization signal over one or more discrete links separate from the communication fabric, and distribute the timer synchronization signal to the plurality of processing systems; and
each of the plurality of processing systems configured to:
maintain an associated local counter;
reset the associated local counter to an initial value responsive to assertion of the timer synchronization signal provided by the control processor;

add timestamps indicating current values of the associated local counter into packet headers of received ones of the storage operations; and reorder committing of the storage operations to the plurality of storage drives over the communication fabric based at least on the timestamps indicated by the storage operations.

2. The data storage system of claim 1, comprising:

each of the plurality of processing systems configured to monitor for an asserted non-maskable interrupt (NMI) signal comprising the timer synchronization signal and responsively clear the associated local counter until de-assertion of the NMI signal;

upon de-assertion of the NMI signal, each of the plurality of processing systems configured to begin incrementing the associated local counter and apply the associated local counter as the timestamps to the received ones of the storage operations.

3. The data storage system of claim 1, comprising:

a first of the processing systems configured to receive a first storage operation and assign a first timestamp to the first storage operation based on the associated local counter maintained by the first processing system;

the first of the processing systems configured to determine that the first storage operation corresponds to a storage drive managed by a second of the processing systems, and responsively transfer the first storage operation with the first timestamp for delivery to the second of the processing systems;

the second of the processing systems configured to reorder committing of the first storage operation to the storage drive managed by the second of the processing systems based at least on the first timestamp of the first storage operation and further timestamps of ones of the storage operations in a transaction queue of the second of the processing systems.

4. The data storage system of claim 1, comprising:

the control processor configured to distribute the timer synchronization signal to an associated subset of the plurality of processing systems included in a first enclosure of the data storage system, and further distribute a master timer synchronization signal to at least one further control processor in at least one other enclosure of the data storage system, where the at least one further control processor distributes a local timer synchronization signal based on the master timer synchronization signal to associated ones of the plurality of processing systems in the at least one other enclosure of the data storage system.

5. The data storage system of claim 4, comprising:

the control processor configured to be a master control processor among a plurality of control processors comprising the control processor and the at least one further control processor, and responsively distribute the master timer synchronization signal.

6. The data storage system of claim 4, comprising:

the control processor configured to transfer the master timer synchronization signal to the at least one further control processor in the at least one other enclosure of the data storage system over a signal link comprising the one or more discrete links within mini-SAS HD cabling that is used to carry Peripheral Component Interconnect Express (PCIe) signaling comprising the communication fabric between the enclosure and the at least one other enclosure.

7. The data storage system of claim 1, comprising:

the control processor configured to identify at least transmission delays on the one or more discrete links for distributing the timer synchronization signal to each of the plurality of processing systems, and responsively indicate associated ones of the transmission delays to the plurality of processing systems.

8. The data storage system of claim 7, comprising:

the plurality of processing systems each configured to identify an offset for the timer synchronization signal based at least on the associated ones of the transmission delays to synchronize the local counters among the plurality of processing systems.

9. The data storage system of claim 1, wherein the communication fabric comprises a switched Peripheral Component Interconnect Express (PCIe) fabric shared among the plurality of processing systems and the plurality of storage drives; and wherein the one or more discrete links are coupled to general purpose input/output pins of the plurality of processing systems.

10. A method of operating a data storage system, the method comprising:

in a plurality of processing systems, receiving storage operations for a plurality of storage drives coupled over a communication fabric, with each of the plurality of storage drives configured to store data and retrieve the data stored on associated storage media responsive to the storage operations;

in a control processor, establishing a timer synchronization signal and distributing the timer synchronization signal over one or more discrete links separate from the communication fabric to the plurality of processing systems;

in each of the plurality of processing systems:

resetting an associated local counter to an initial value responsive to assertion of the timer synchronization signal provided by the control processor;

adding timestamps indicating current values of the associated local counter into packet headers of received ones of the storage operations; and reordering committing of the storage operations to the plurality of storage drives over the communication fabric based at least on the timestamps indicated by the storage operations.

11. The method of claim 10, further comprising:

in each of the plurality of processing systems, monitoring for an asserted non-maskable interrupt (NMI) signal comprising the timer synchronization signal and responsively clearing the associated local counter until de-assertion of the NMI signal;

upon de-assertion of the NMI signal, in each of the plurality of processing systems, commencing incrementing the associated local counter and applying the associated local counter as the timestamps to the received ones of the storage operations.

12. The method of claim 10, further comprising:

in a first of the processing systems, receiving a first storage operation and assigning a first timestamp to the first storage operation based on the associated local counter maintained by the first processing system;

in the first of the processing systems, determining that the first storage operation corresponds to a storage drive managed by a second of the processing systems, and responsively transferring the first storage operation with the first timestamp for delivery to the second of the processing systems;

in the second of the processing systems, reordering committing of the first storage operation to the storage drive managed by the second of the processing systems based at least on the first timestamp of the first storage operation and further timestamps of ones of the storage operations in a transaction queue of the second of the processing systems.

13. The method of claim 10, further comprising:
in the control processor, distributing the timer synchronization signal to an associated subset of the plurality of processing systems included in a first enclosure of the data storage system, and distributing a master timer synchronization signal to at least one further control processor in at least one other enclosure of the data storage system, where the at least one further control processor distributes a local timer synchronization signal based on the master timer synchronization signal to associated ones of the plurality of processing systems in the at least one other enclosure of the data storage system.

14. The method of claim 13, wherein the control processor is configured to be a master control processor among a plurality of control processors comprising the control processor and the at least one further control processor, and further comprising:
in the control processor, responsively distributing the master timer synchronization signal.

15. The method of claim 13, further comprising:
in the control processor, transferring the master timer synchronization signal to the at least one further control processor in the at least one other enclosure of the data storage system over a signal link comprising the one or more discrete links within mini-SAS HD cabling that is used to carry Peripheral Component Interconnect Express (PCIe) signaling comprising the communication fabric between the enclosure and the at least one other enclosure.

16. The method of claim 10, further comprising:
in the control processor, identifying at least transmission delays on the one or more discrete links for distributing the timer synchronization signal to each of the plurality of processing systems, and responsively indicating associated ones of the transmission delays to the plurality of processing systems.

17. The method of claim 16, further comprising:
in each of the plurality of processing systems, identifying an offset for the timer synchronization signal based at least on the associated ones of the transmission delays to synchronize the local counters among the plurality of processing systems.

18. The method of claim 10, wherein the communication fabric comprises a switched Peripheral Component Interconnect Express (PCIe) fabric shared among the plurality of processing systems and the plurality of storage drives; and
wherein the one or more discrete links are coupled to general purpose input/output pins of the plurality of processing systems.

19. A data storage system, comprising:
a plurality storage drives configured to store data and retrieve the data stored on associated storage media responsive to data transactions;
one or more processing modules configured to each manage only an associated subset of the plurality of storage drives, each of the one or more processing modules coupled to an associated communication interface configured to receive storage transactions for any of the plurality of storage drives;
a management processor configured to establish a timer synchronization signal and distribute the timer synchronization signal over one or more discrete interrupt links to the one or more processing modules;
the one or more processing modules configured to reset associated local counters to an initial value responsive to assertion of the timer synchronization signal provided by the management processor;
the one or more processing modules configured to receive the storage transactions, responsively add into packet headers of the storage transactions indications of timestamps based on the associated local counters, and selectively transfer ones of the storage transactions to at least another of the processing modules for handling of the ones of the storage transactions; and
each of the one or more processing modules configured to reorder a commit process for the storage transactions intended for the associated subset of the plurality of storage drives based at least on the indications of timestamps of the storage transactions.

20. The data storage system of claim 19, comprising:
the management processor configured to identify at least transmission delays on the one or more discrete links for distributing the timer synchronization signal to each of the one or more processing modules, and responsively indicate associated ones of the transmission delays to the one or more processing modules; and
the one or more processing modules configured to determine an offset for the timer synchronization signal based at least on the associated ones of the transmission delays to synchronize the associated local counters among the one or more processing modules.

* * * * *